A. J. KEISTER.
ARTIFICIAL BAIT.
APPLICATION FILED DEC. 12, 1917.

1,272,812.

Patented July 16, 1918.

Inventor
Archibald J. Keister
By Dwight Bair Attorneys

UNITED STATES PATENT OFFICE.

ARCHIBALD J. KEISTER, OF GRINNELL, IOWA, ASSIGNOR OF ONE-HALF TO E. S. ERDICE, OF KEOTA, IOWA.

ARTIFICIAL BAIT.

1,272,812.  Specification of Letters Patent.  Patented July 16, 1918.

Application filed December 12, 1917. Serial No. 206,838.

*To all whom it may concern:*

Be it known that I, ARCHIBALD J. KEISTER, a citizen of the United States, and resident of Grinnell, in the county of Poweshiek and State of Iowa, have invented a new and useful Artificial Bait, of which the following is a specification.

The object of my invention is to provide an artificial bait of simple, durable and inexpensive construction.

Still a further object is to provide an artificial bait having means whereby the ring on the hook may be quickly and easily secured to the artificial bait or be removed therefrom without the use of tools or the like.

Still a further object is to provide an attachment for use with artificial bait comprising means including a spring lock device whereby the ring on the hook shank may be quickly and easily fastened to the bait at such a point as to be located within the outlines of the bait and in such manner as to permit the hook to swing freely on the bait in the ordinary way.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Figure 1:
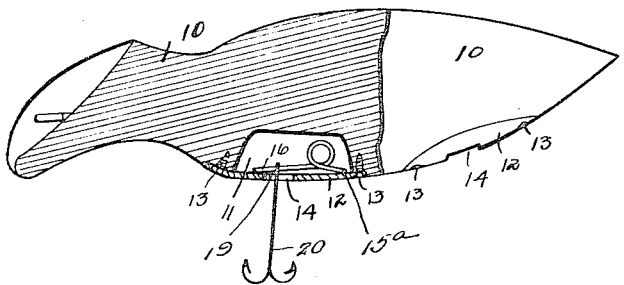
Figure 1 shows a side elevation of an artificial bait embodying my invention, part of the bait being shown in vertical cross section.
Figure 2:
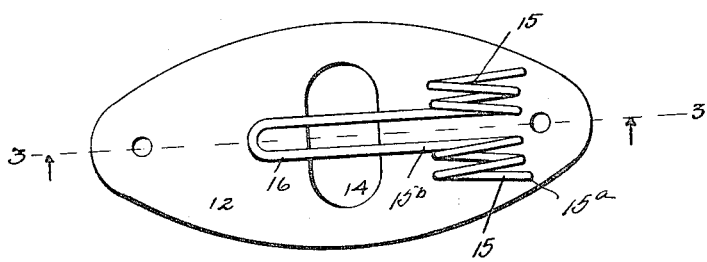
Fig. 2 shows a plan view of the plate and spring catch device forming a part of my artificial bait viewed from inside the bait.
Figure 3:
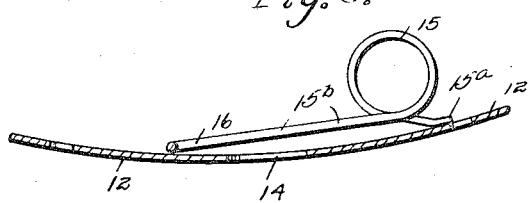
Fig. 3 shows a sectional view taken on the line 3—3 of Fig. 2.

In the accompanying drawing I have used the reference numeral 10 to indicate generally the body of an artificial bait, which may have any suitable form for the purpose and may be brightly colored if desired.

The body 10 is formed with a recess 11. An attachment comprising a plate 12 designed to fit against the body 10 and cover the recess 11 is illustrated in Fig. 1. The plate 12 is set on or flush with the outer surface of the body 10 and is secured thereto by means of screws 13 or the like so that the body 10 and the plate 12 may be painted over in such a way as to practically conceal the plate 12. The plate 12 is formed with a transversely elongated opening 14. Secured to the inner side of the plate 12 is a spring catch device preferably having the form of two sections 15 of coil spring each having one end 15ª secured to the plate 12 and having another end 15ᵇ connected with a common yoke 16 extending along the under surface of the plate 12 across the opening 14.

In the practical use of my improved artificial bait the ring 19 on the ends of the shank of the hook 20 is slipped through the opening 14 and over the free end of the yoke 16. As soon as the inner portion of the ring passes the end of the yoke 16 the end of the yoke will spring through the ring on the shank of the hook and the hook will then be pivotally mounted on the yoke 16. When it is desired to remove the hook it is simply pushed farther in and twisted sidewise until the yoke 16 lifts the ring on the end of the hook whereby the shank of the hook of the ring may be withdrawn through the opening 14 forcing the yoke to one side during the removal operation. With a little practice this can be done very rapidly.

The advantages of a device of this kind are largely obvious from the foregoing description. The hook may be quickly and easily installed or removed from the artificial bait making it possible to mount hooks of different sizes and shapes on the bait. I find that it is a considerable advantage to fasten the ring on the hook inside the outline of the artificial bait where it does not catch on weeds and brushes.

With the form of my device herein shown it will be seen that the hooks may be detached or attached any number of times without impairing the fastener or the bait. Another advantage of a device of this kind is that it arises from the ease and rapidity from which the hooks may be removed which makes it convenient to carry the bait with the hooks detached, which requires less space than would otherwise be the case and also less care and inconvenience. It also increases the safety with which the hooks may be carried. The fish may be removed from the hook more easily by first removing the hook from the bait.

My device may be made in a number of forms and it is my intention to cover by my claims any modified forms of structure or use of mechanical equivalents, which may be reasonably included within their scope.

I claim as my invention:

1. An artificial bait comprising a body having a recess, a plate for covering said recess having an elongated opening, a spring on the under side of said plate having a free end extended across said opening substantially at right-angles to its longitudinal axis.

2. An artificial bait comprising a recess, a plate for covering said recess having an elongated opening, a spring on the under side of said plate, having a U-shaped yoke extended across said opening substantially at right-angles to the longitudinal axis thereof and having a coil at each end of said yoke, each coil having one end secured to said plate.

Des Moines, Iowa, November 21, 1917.

ARCHIBALD J. KEISTER.